United States Patent
Kaul et al.

(10) Patent No.: US 12,360,272 B2
(45) Date of Patent: Jul. 15, 2025

(54) CASCADED MACHINE-LEARNING WORKFLOW FOR SALT SEISMIC INTERPRETATION

(71) Applicant: Schlumberger Technology Corporation, Sugar Land, TX (US)

(72) Inventors: Anisha Kaul, Houston, TX (US); Cen Li, Missouri City, TX (US); Hiren Maniar, Houston, TX (US); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 986 days.

(21) Appl. No.: 17/252,484

(22) PCT Filed: Jun. 26, 2019

(86) PCT No.: PCT/US2019/039160
§ 371 (c)(1),
(2) Date: Dec. 15, 2020

(87) PCT Pub. No.: WO2020/009850
PCT Pub. Date: Jan. 9, 2020

(65) Prior Publication Data
US 2021/0270983 A1    Sep. 2, 2021

Related U.S. Application Data

(60) Provisional application No. 62/694,404, filed on Jul. 5, 2018.

(51) Int. Cl.
*G06G 7/48* (2006.01)
*G01V 1/30* (2006.01)
(Continued)

(52) U.S. Cl.
CPC ............ *G01V 1/302* (2013.01); *G01V 1/50* (2013.01); *G06N 20/00* (2019.01); *G01V 2210/1234* (2013.01); *G01V 2210/64* (2013.01)

(58) Field of Classification Search
CPC ........ G01V 1/282; G01V 1/301; G01V 1/302; G01V 1/50; G01V 2210/1234;
(Continued)

(56) References Cited

U.S. PATENT DOCUMENTS 10,139,509 B2    11/2018    Sun et al.
2009/0119018 A1    5/2009    Priezzhev et al.
(Continued)

FOREIGN PATENT DOCUMENTS

CN    102121995 A    7/2011
CN    104459768 A    3/2015
(Continued)

OTHER PUBLICATIONS

Yang, Tao, Bing Zhang, and Jinghuai Gao. "A fast algorithm for coherency estimation in seismic data based on information divergence." Journal of Applied Geophysics 115 (2015): 140-144. (Year: 2015).*
(Continued)

*Primary Examiner* — Nithya J. Moll
(74) *Attorney, Agent, or Firm* — Jeffrey D. Frantz

(57) ABSTRACT

A method includes determining a top of salt (TOS) surface in a seismic volume based on a crossline direction of the seismic volume and an inline direction of the seismic volume. The method also includes determining a binary mask based upon the TOS surface. The method also includes sampling seismic data in the seismic volume to obtain a training seismic slice. The method also includes sampling the binary mask to obtain a mask slice. The method also includes selecting a first coordinate in the training seismic
(Continued)

slice to produce a first tile. The method also includes selecting a second coordinate in the mask slice to produce a second tile. The method also includes generating or updating a model of the seismic volume based upon the first tile and the second tile.

20 Claims, 13 Drawing Sheets

(51) Int. Cl.
*G01V 1/50* (2006.01)
*G06N 20/00* (2019.01)

(58) Field of Classification Search
CPC .......... G01V 2210/64; G01V 2210/66; G01V 2210/667; G06N 20/00
See application file for complete search history.

(56) References Cited

U.S. PATENT DOCUMENTS

| | | | |
|---|---|---|---|
| 2012/0209526 A1* | 8/2012 | Imhof | G01V 1/306 702/5 |
| 2015/0185346 A1* | 7/2015 | Nemeth | G01V 1/36 702/18 |
| 2016/0086352 A1 | 3/2016 | Birkbeck et al. | |
| 2016/0202374 A1 | 7/2016 | Kainkaryam et al. | |

FOREIGN PATENT DOCUMENTS

| | | |
|---|---|---|
| CN | 105659111 A | 6/2016 |
| CN | 105700015 A | 6/2016 |
| WO | 2016154104 A1 | 9/2016 |

OTHER PUBLICATIONS

Asjad, Amin, and Deriche Mohamed. "A new approach for salt dome detection using a 3D multidirectional edge detector." Applied Geophysics 12.3 (2015): 334-342. (Year: 2015).*
Amin, Asjad, and Mohamed Deriche. "A hybrid approach for salt dome detection in 2D and 3D seismic data." 2015 IEEE International Conference on Image Processing (ICIP). IEEE, 2015. (Year: 2015).*
Communication pursuant to Article 94(3) issued in European Patent Application 19830819.9 dated Dec. 18, 2023, 8 pages.
Ferreira et al., "Multi-scale Evaluation of Texture Features for Salt Dome Detection", 2016 IEEE International Symposium on Multimedia (ISM), Dec. 11, 2016, pp. 632-635.
Extended European Search Report issued in European Patent Application No. 19830819.9 dated Mar. 3, 2022; 21 pages.
International Preliminary Report on Patentability of International Patent Application No. PCT/US2019/039160 dated Jan. 5, 2021, 6 pages.
Ian F. Jones and Ian Davison (2014). "Seismic imaging in and around salt bodies." Interpretation, 2(4), SL1-SL20.
G. Pass, R. Zabith, "Comparing Images Using Joint Histograms", Multimedia Systems, vol. 7, pp. 234-240, 1999.
Sean P. Engelson and Drew V. McDermott. Image signatures for place recognition and map construction. In SPIE Sensor Fusion IV, pp. 282-293, 1991.
Amin, A. et al., 'Salt-Dome Detection Using a Codebook-Based Learning Model', IEEE Geoscience and Remote Sensing Letters, vol. 13, No. 11, Nov. 2016, pp. 1636-1640.
Chaki, S. et al., 'Well-Log and Seismic Data Integration for Reservoir Characterization, A signal processing and machine-learning perspective', Subsurface Exploration: Recent Advances in Geo-Signal Processing, Interpretation, and Learning, IEEE Signal Processing Magazine, vol. 35, No. 2, Mar. 2018, pp. 72-81.
International Search Report and Written Opinion issued in the PCT Application PCT/US2019/039160, dated Aug. 12, 2019 (10 pages).
First Office Action issued in China Patent Application No. 2019800430458 dated Jun. 28, 2023, 23 pages with English translation.

* cited by examiner

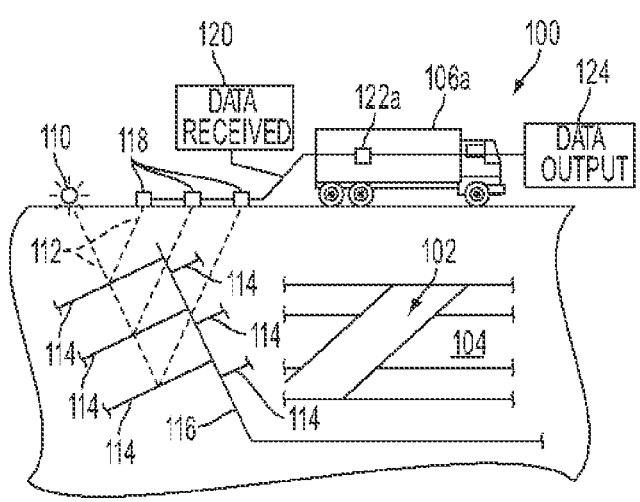
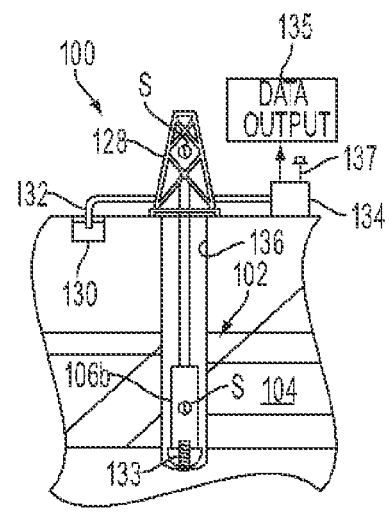
FIG. 1A  FIG. 1B
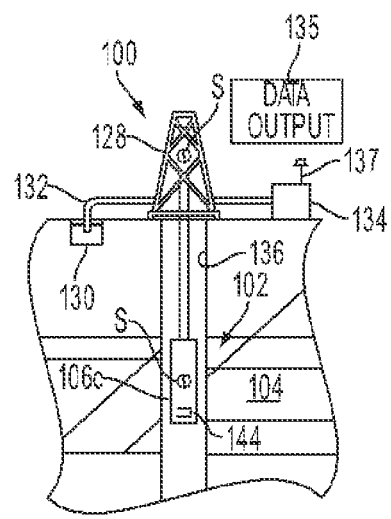
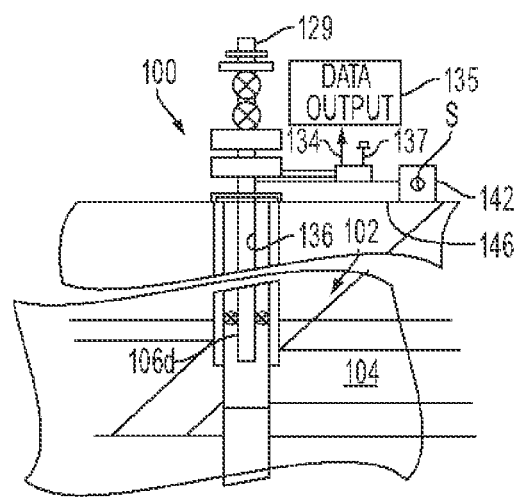
FIG. 1C  FIG. 1D

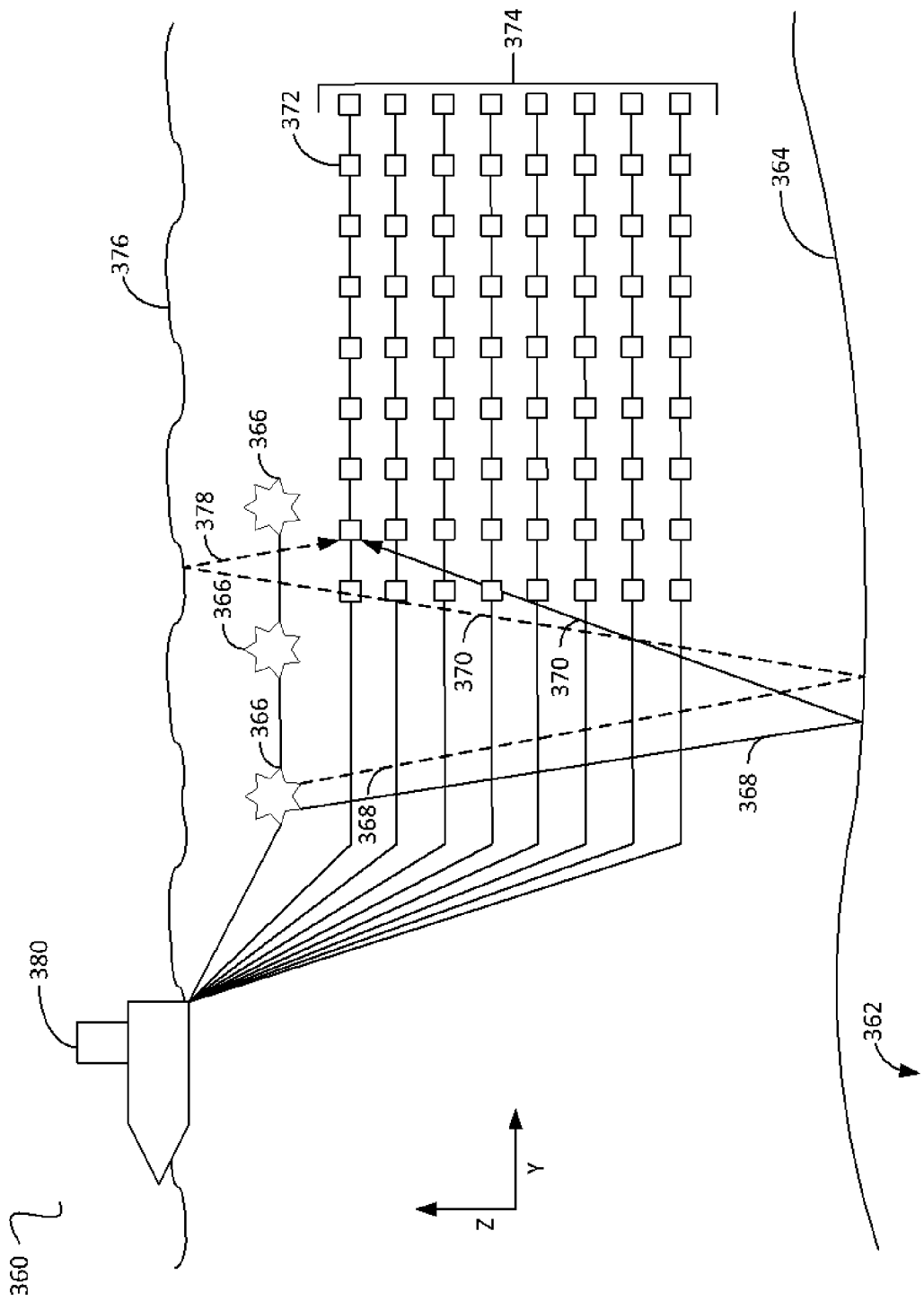

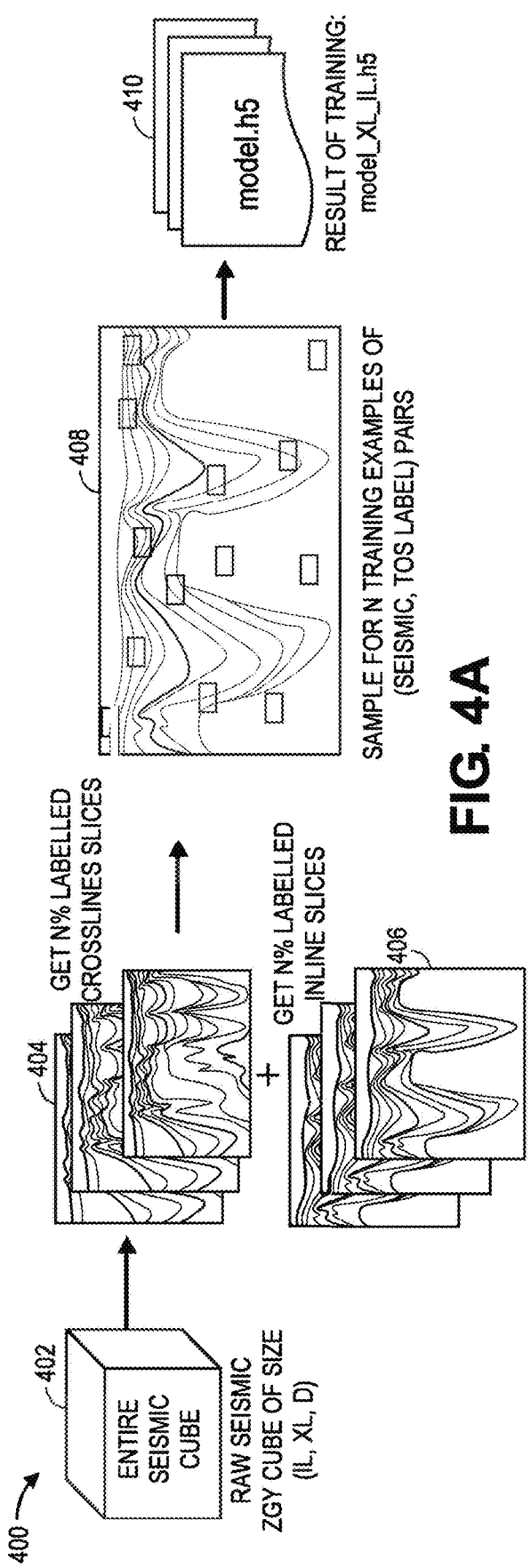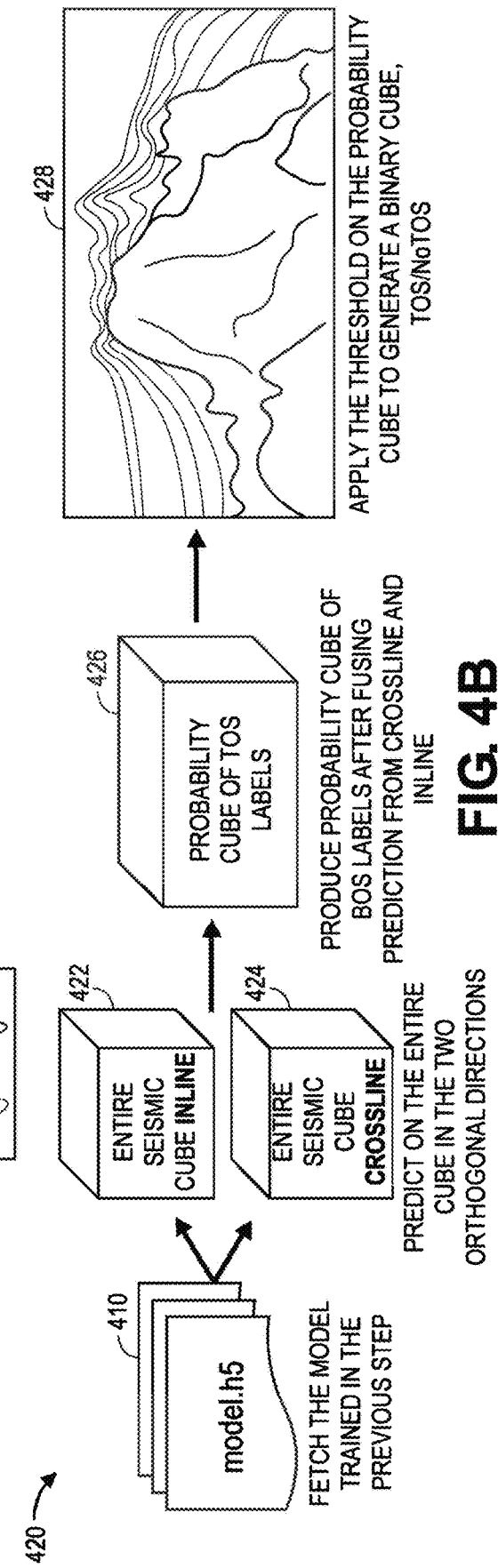
FIG. 4A
FIG. 4B

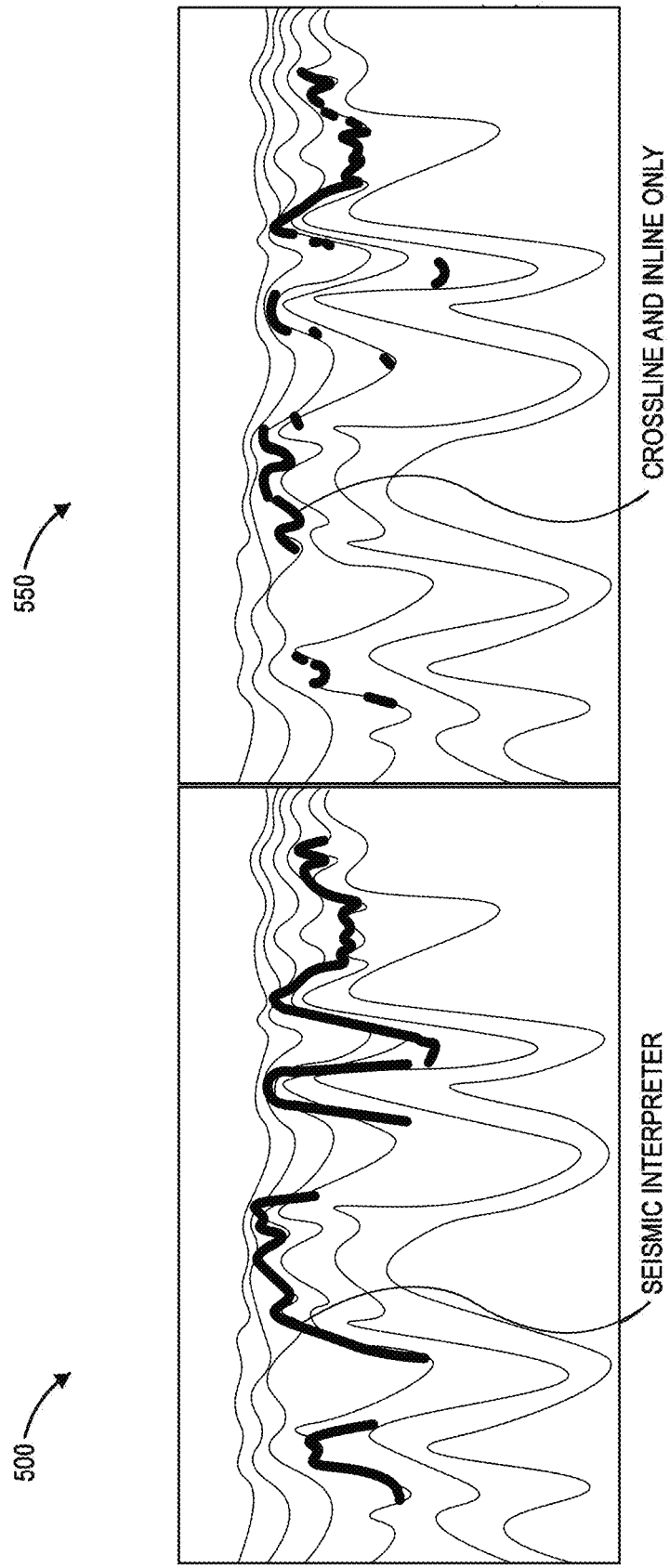

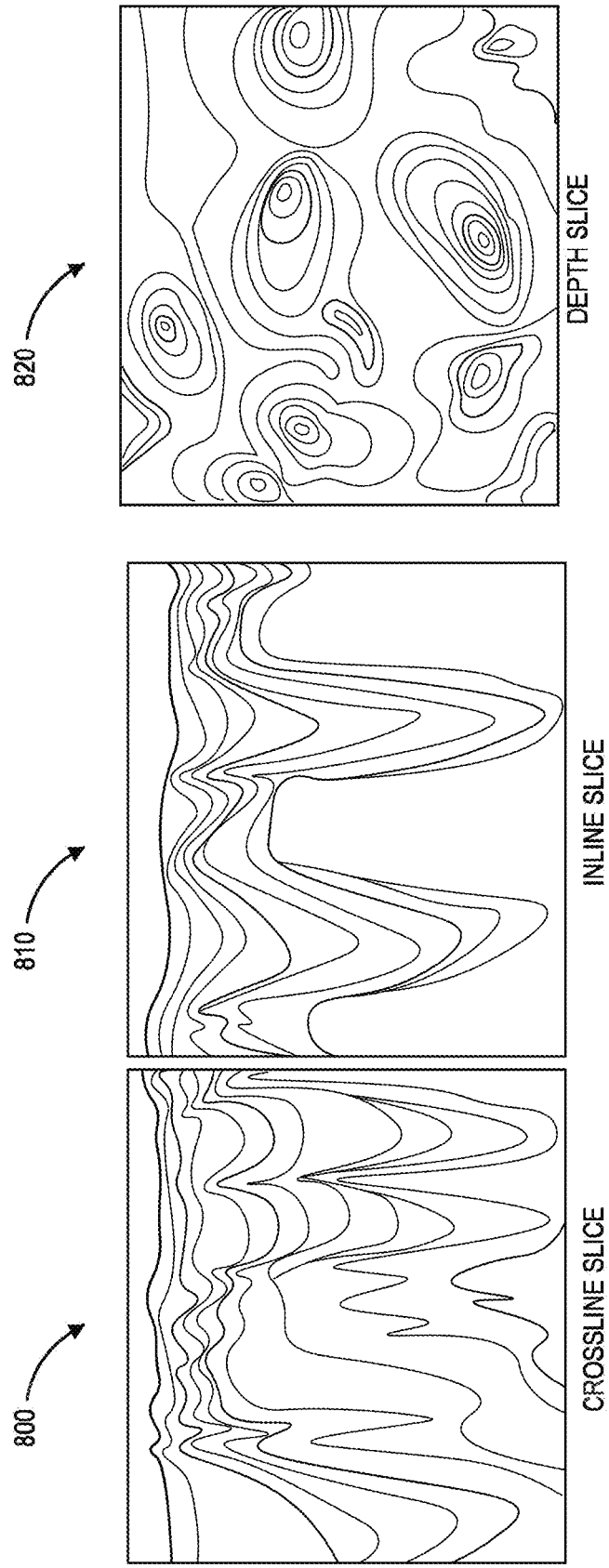

CASCADED MACHINE-LEARNING WORKFLOW FOR SALT SEISMIC INTERPRETATION

This application is a National Stage Entry of International Application No. PCT/US2019/039160, filed Jun. 26, 2019, which claims priority to U.S. Provisional Patent Application No. 62/694,404, filed on Jul. 5, 2018, the entirety of which is incorporated by reference herein.

BACKGROUND

This application claims priority to U.S. Provisional Patent Application No. 62/694,404, filed on Jul. 5, 2018, the entirety of which is incorporated by reference herein.

BACKGROUND

A robust earth model may be used to create a high-fidelity image of a subterranean formation. Often, earth models include geological features such as salt (e.g., halite) bodies and seismic facies. Delineating or interpreting these geological features may be used to model salt velocity. In addition, seismic interpretation may be used to generate an accurate and geologically-sound annotation of an oil and gas survey area (e.g., a wellsite above the subterranean formation).

Examples of interpretation activities include geobody extraction, fault interpretation, horizon interpretation, and salt interpretation. Multiple interpreters may spend months interpreting horizons to isolate salt bodies with the goal of creating an accurate structural earth model encompassing thousands of squared kilometers. This involves manually selecting horizons on a coarse grid. This selection process may be iterated until a surface meets predetermined criteria within the subterranean formation. The underlying effort may vary with both the complexity of the salt boundaries, as well as the size of the seismic survey. Thus, as will be appreciated, this process may be both laborious and highly biased by an interpreter's view and experience. Nevertheless, salt diapirs are useful geological features because such formations act as natural traps for hydrocarbons (e.g., oil and gas).

SUMMARY

A method includes determining a top of salt (TOS) surface in a seismic volume based on a crossline direction of the seismic volume and an inline direction of the seismic volume. The method also includes determining a binary mask based upon the TOS surface. The method also includes sampling seismic data in the seismic volume to obtain a training seismic slice. The method also includes sampling the binary mask to obtain a mask slice. The method also includes selecting a first coordinate in the training seismic slice to produce a first tile. The method also includes selecting a second coordinate in the mask slice to produce a second tile. The method also includes generating or updating a model of the seismic volume based upon the first tile and the second tile.

In another embodiment, the method includes determining a top of salt (TOS) surface in a seismic volume based on a crossline direction of the seismic volume and an inline direction of the seismic volume. The method also includes determining a binary mask based upon the TOS surface. The method also includes sampling seismic data in the seismic volume to obtain a training seismic slice. The method also includes sampling the binary mask to obtain a mask slice. The method also includes selecting a first coordinate in the training seismic slice to produce a first tile. The method also includes selecting a second coordinate in the mask slice to produce a second tile. The method also includes generating or updating a model of the seismic volume based upon the first tile and the second tile. The method also includes sampling the seismic data in the seismic volume to obtain an evaluation seismic slice. The method also includes determining a presence of a salt body in the evaluation seismic slice based upon the seismic data in the evaluation seismic slice. The method also includes generating or updating a three-dimensional (3D) matrix based upon the model and the evaluation seismic slice. The 3D matrix indicates the presence of the salt body.

A computing system is also disclosed. The computing system includes one or more processors and a memory system. The memory system includes one or more non-transitory computer-readable media storing instructions that, when executed by at least one of the one or more processors, cause the computing system to perform operations. The operations include determining a top of salt (TOS) surface in a seismic volume based upon a crossline direction of the seismic volume and an inline direction of the seismic volume. The operations also include determining a binary mask based upon the TOS surface. The binary mask includes a binary two-dimensional (2D) matrix. The operations also includes sampling seismic data in the seismic volume to a first depth to obtain a training seismic slice. The operations also include sampling the binary mask to obtain a mask slice. The operations also include selecting a first coordinate in the training seismic slice to produce a first tile. The operations also include selecting a second coordinate in the mask slice to produce a second tile. The operations also include generating or updating a model of the seismic volume based upon the first tile and the second tile. The operations also include sampling the seismic data in the seismic volume to a second depth to obtain an evaluation seismic slice. The second depth is greater than the first depth. The operations also include determining a presence of a salt body in the evaluation seismic slice based upon the seismic data in the evaluation seismic slice. The operations also include generating or updating a three-dimensional (3D) matrix based upon the model and the evaluation seismic slice. The 3D matrix indicates the presence of the salt body. The operations also include extracting a geobody from the 3D matrix. The operations also include extracting a surface from the geobody. The operations also include determining a presence of hydrocarbons in the seismic volume based upon the 3D matrix, the geobody, the surface, or a combination thereof.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 4A illustrates a flowchart of a crossline/inline-based machine-learning training workflow, according to an embodiment.

FIG. 4B illustrates a flowchart of a crossline/inline-based machine-learning prediction workflow, according to an embodiment.

FIG. 5A illustrates a model trained by a seismic interpreter, according to an embodiment.

FIG. 5B illustrates a model trained on crossline and inline directions of a seismic survey where the flanks are poorly-captured and the resulting predicted surfaces are discontinuous, according to an embodiment.

FIG. 8A illustrates an image showing the amplitude distribution of the crossline direction, according to an embodiment.

FIG. 8B illustrates an image showing the amplitude distribution of the inline direction, according to an embodiment.

FIG. 8C illustrates an image showing the amplitude of a depth slice obtained in the depth direction, according to an embodiment.

DESCRIPTION OF EMBODIMENTS

Figure 2:
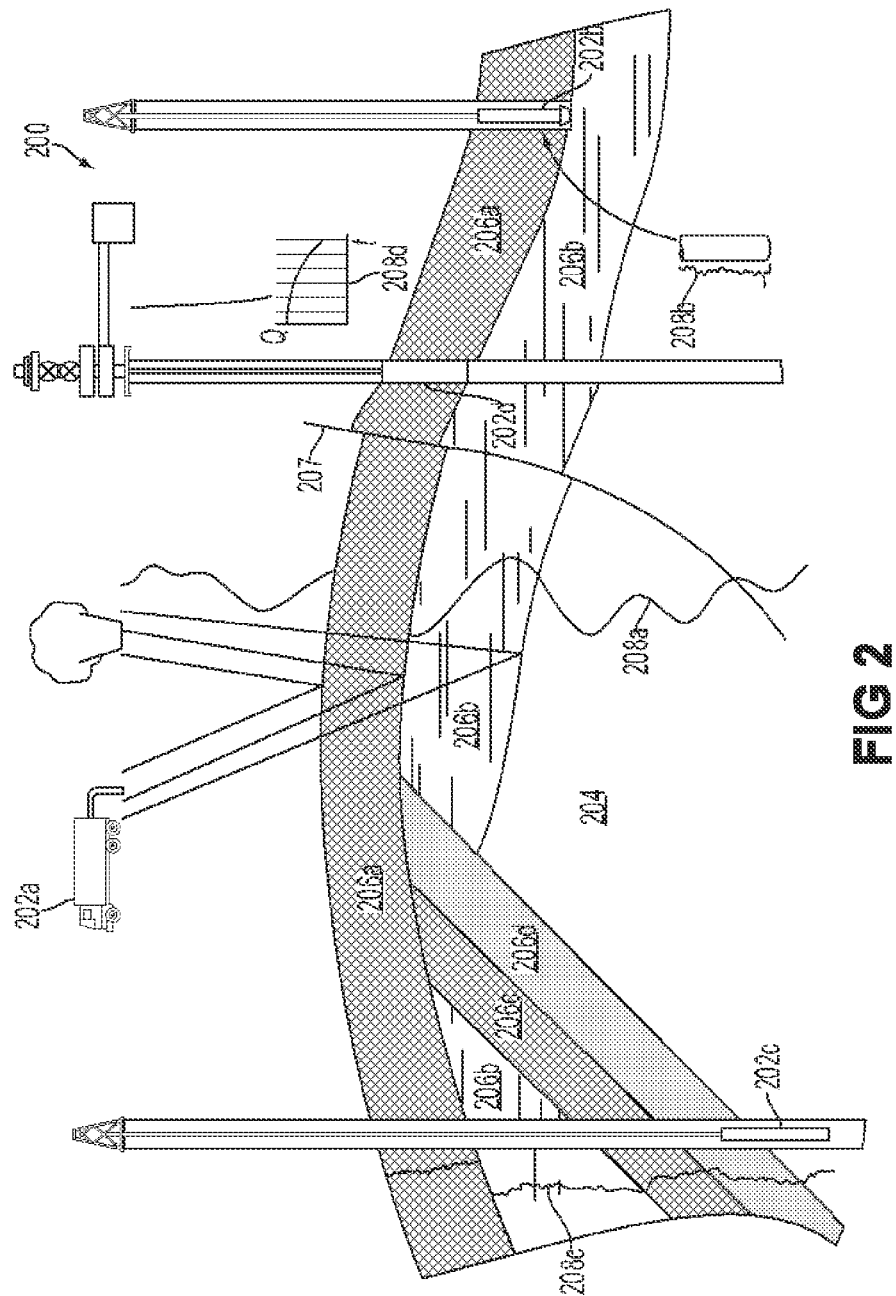

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors(S), such as gauges, may be positioned about oilfield 100 to collect data relating to various oilfield operations as described previously. As shown, sensor(S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors(S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors(S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors(S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors(S), such as gauges, may be positioned about oilfield 100 to collect data relating to various field operations as described previously. As shown, the sensor(S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors(S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a -202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206.1 and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
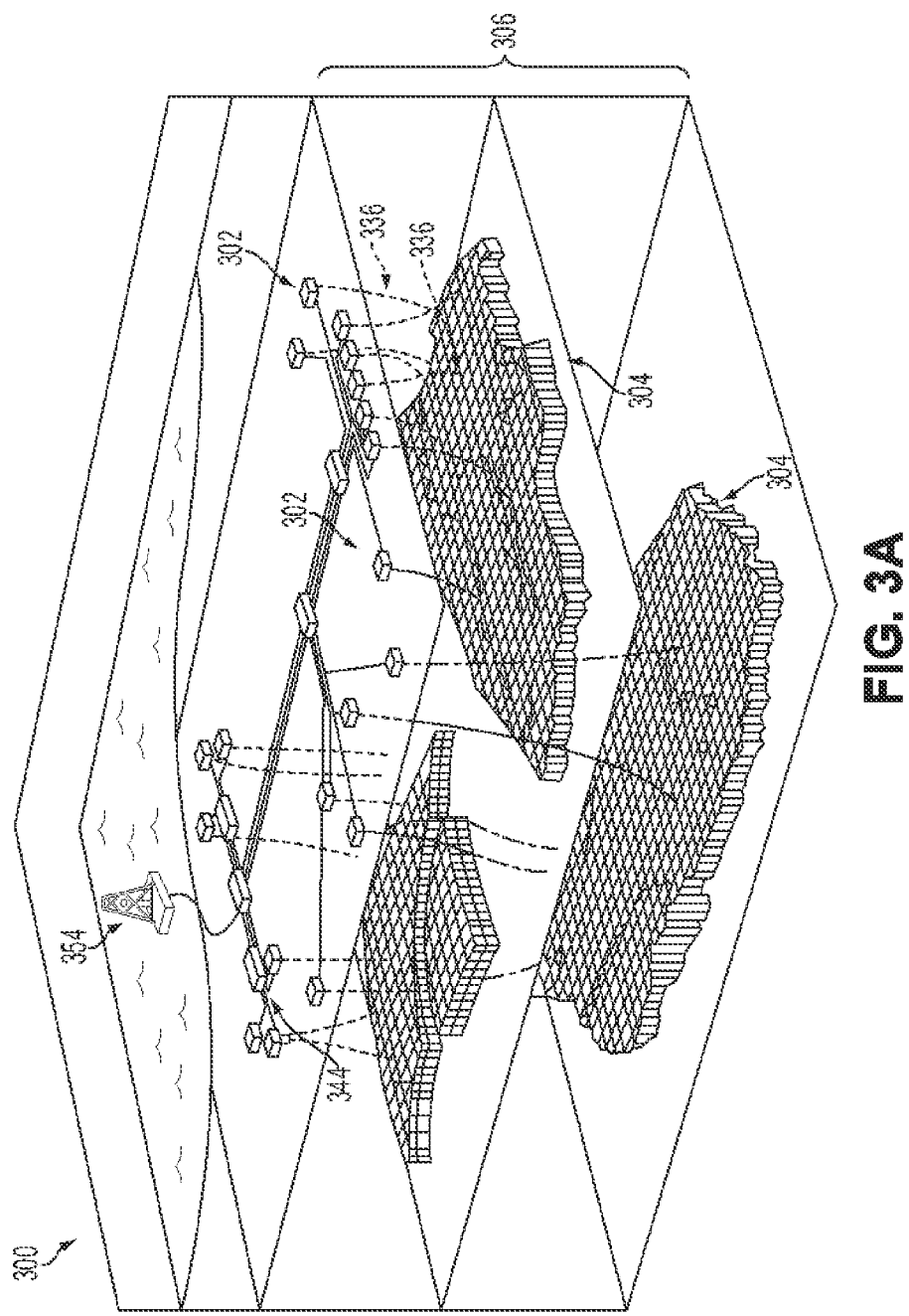

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

The present disclosure may use a machine-learning (ML)-based workflow to identify and delineate a salt body and its boundaries. An earth model building workflow may start at a top of salt (TOS) interpretation on a version of seismic survey followed by a base of salt (BOS) interpretation on a different version of the same seismic survey that is obtained after migrating salt velocities having known the TOS. The image of the seismic survey may appear to become clearer as the TOS and BOS are interpreted, which may highlight seismic events that were hidden before the salt velocities were flooded at one or more migrations.

One way to interpret the top and base of salt horizons may include making predictions with minimal prompting from the data. In other words, the user may take/use as few examples from the seismic volume at hand as possible. Additionally, information from the three orthogonal directions (e.g., crossline, inline, and depth) can be used, instead of using just two (crossline and inline).

Fundamentally, the purpose of a ML model is to mimic the interpretation workflow that seismic interpreters follow. For seismic interpretation, the dominant orthogonal directions, (i.e., crossline and inline) may be used to identify features that assist in boundary detection.

FIG. 4A illustrates a flowchart 400 of a crossline/inline-based ML training workflow, according to an embodiment. As shown, seismic data may be received, as at 402. The seismic data may be in the form of a raw seismic ZGY cube having an inline direction, a crossline direction, and a depth direction. One or more crossline slices may then be obtained from the cube of seismic data, as at 404. One or more inline slices may also be obtained from the cube of seismic data, as at 406. In at least one embodiment, the crossline slices and the inline slices may be combined or summed to produce a sample for N training examples of seismic TOS label pairs, as at 408. One or more models may be generated or updated based at least partially upon the sample(s) for the N training examples, as at 410.

FIG. 4B illustrates a flowchart 420 of a crossline/inline-based ML prediction workflow, according to an embodiment. The cube of seismic data may be predicted in the inline direction based at least partially upon the models (from 410), as at 422. The cube of seismic data may also be predicted in the crossline direction based at least partially upon the models (from 410), as at 424. The cubes of seismic data in the inline and crossline directions may be combined or fused. A probability cube of TOS and/or BOS labels may then be generated based at least partially upon the fused prediction, as at 426. A threshold on the probability cube may then be applied to generate a binary cube where, for example, 1=salt; 0=no salt, as at 428.

In FIGS. 4A and/or 4B, an interpreter may select salt along the crossline and the inline directions because this visually permits a determination of the extent of the salt boundaries. Additionally, there may not be tools available that allow geophysicists to interpret in the direction of the depth of the seismic cube.

FIG. 5A illustrates a model 500 trained by a seismic interpreter, and FIG. 5B illustrates a model 550 trained on the crossline and inline directions, according to an embodiment. More particularly, the model 550 is trained on the crossline and inline directions of a seismic survey where the salt flanks are poorly-captured, and the resulting predicted surfaces may be fragmented and incomplete. The ML models that learn from the crossline and inline directions may be restricted to predicting TOS and BOS horizons in the presence of a strongly appearing seismic top/base of salt events. When there is little evidence of a seismic amplitude or a weak signal, the model may not trigger a selection if it is not tuned or does not have the capacity to handle those features that are less apparent visually. According to some seismic interpreters, selecting salt peaks is easier than selecting the flanks because the illumination at the horizontal surfaces is higher than in other locations. Some seismic imaging techniques that use acoustic migration treat energy as noise, which may mislead the interpreter. The inherent geometry of the steep sides of the salt body may result in poor imaging. To remedy this, the depth direction may be used to learn to delineate salt body and, thus, the complete salt horizons.

While there exist ways to solve the posed problem by learning the 3D context by training on small 3D sub-volumes of seismic data, this may involve seismic interpreters expending effort analyzing multiple crosslines and inlines, and may prove to be computationally-intensive. Some embodiments of the method disclosed herein, including 3D information, may transition towards 3D convolutions.

Figure 6:
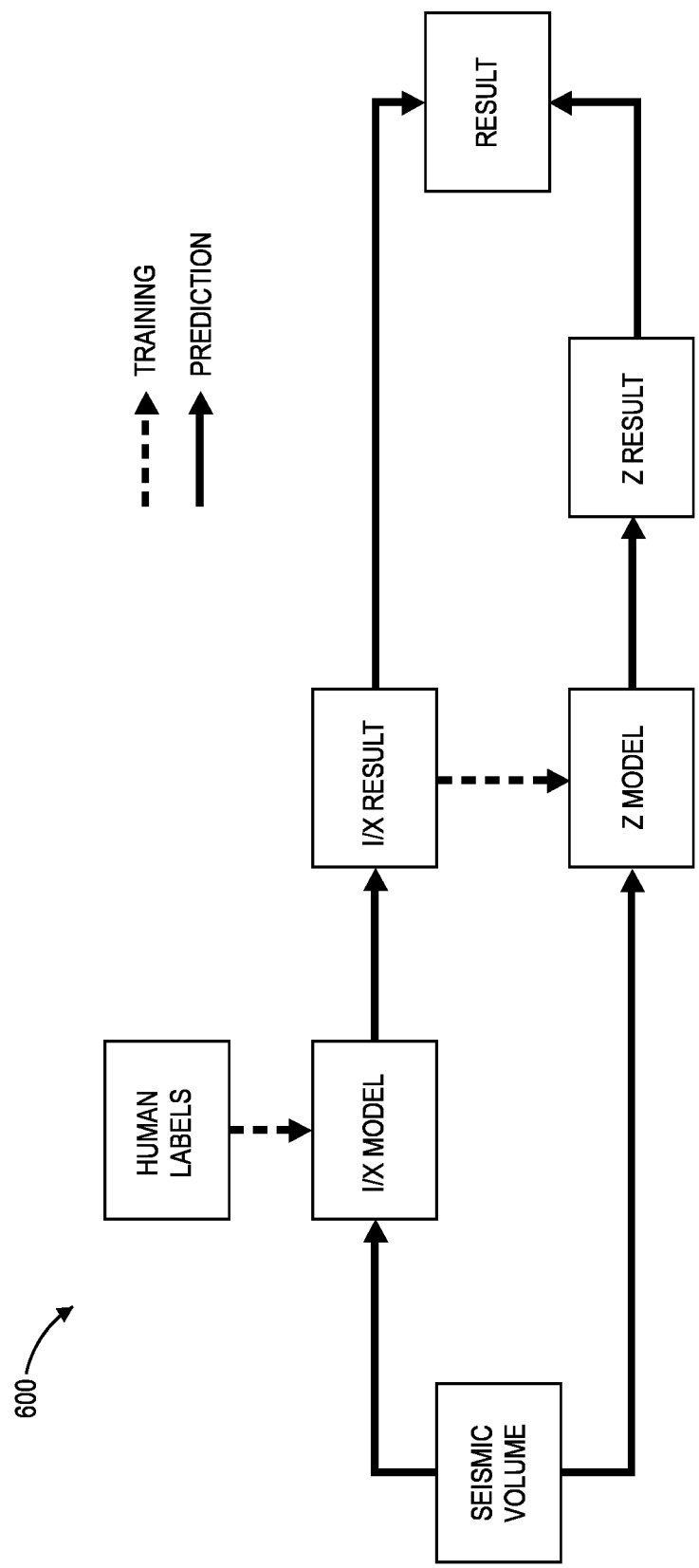
FIG. 6 illustrates a schematic view of a machine-learning-based procedure to improve salt-body detection accuracy and reduce false negatives, according to an embodiment.

The ML procedure may incorporate seismic information from the three directions, namely, crossline slices, inline slices, and depth slices. FIG. 6 illustrates a schematic view of a ML-based procedure 600 for detecting salt bodies, according to an embodiment. The procedure 600 may be conducted in two portions (a training portion and a prediction/evaluation portion). The training portion may include concatenating multiple ML blocks to refine a prediction of the salt in a seismic volume using predictions from a plurality of iterations of a model as the ground truth to a depth model. The prediction/evaluation portion may include using the information gained from the same seismic volume as the prediction portion. However, the prediction evaluation portion may involve additional dimensions and/or perspectives, as described in greater detail below.

Using Depth Slices for Complementary ML Builds

Figure 7B:
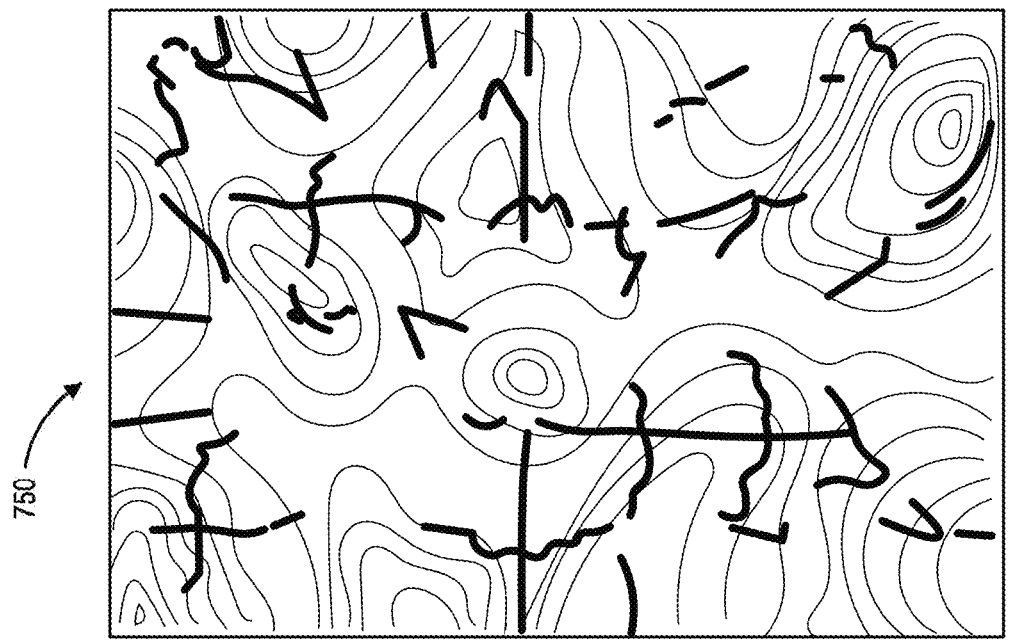
FIG. 7B illustrates an image including sparse labels across the crossline and inline directions, according to an embodiment.
Figure 7A:
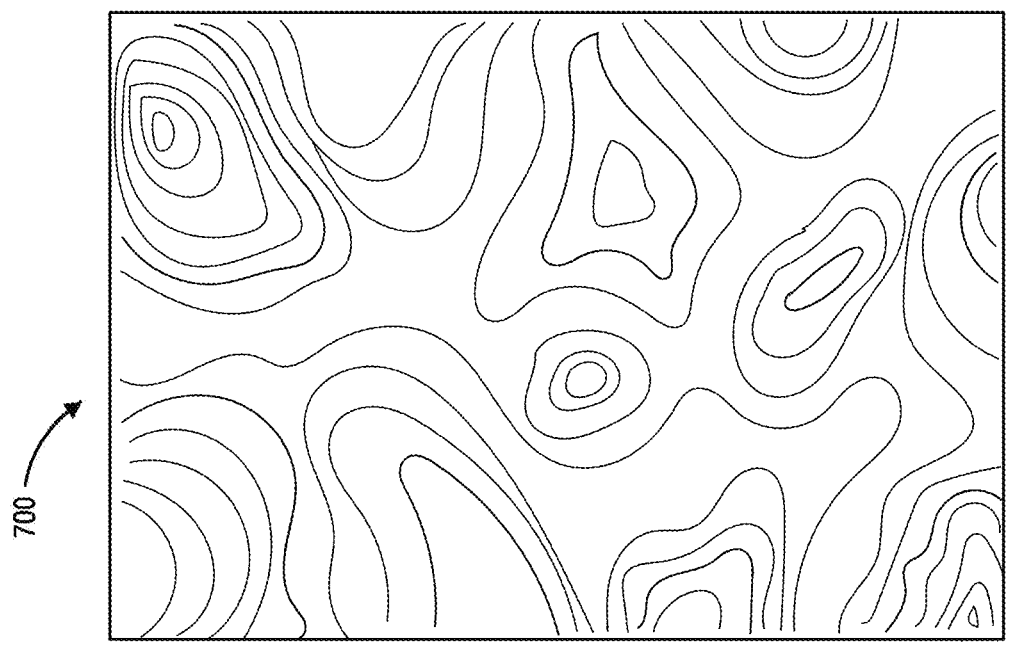
FIG. 7A illustrates an image including dense labels in the crossline and inline directions that lead to a dense salt body when viewed along the depth slice, according to an embodiment.

FIG. 7A illustrates an image 700 including dense labels in crossline and inline directions that lead to a dense salt body when viewed along a depth slice, and FIG. 7B illustrates an image 750 including sparse labels across the crossline and inline directions that lead in points that can be seen in the grid, according to an embodiment. As used herein, "dense labels" refers to a watertight surface that is the outcome of seismic interpretation done throughout the seismic cube, and "sparse labels" refers to a fragmented surface that is the outcome of seismic interpretation done sparsely across the seismic cube. The extent of the salt along the depth slices may be viewed if interpretations of the surface are made densely along the crossline and the inline directions (as shown in FIG. 7A). If the crossline and the inline labels are sparsely picked, the extent of the salt along the depth slice may give an incomplete surface, as shown in FIG. 7B. This means that building a supervised ML model that is to be trained on samples along the depth of the seismic survey using sparsely interpreted lines in the crossline and inlines, as shown in FIG. 7B, may not be constructive because very few seismic cells are going to be seen as part of a salt body as seen in depth. Thus, densely-labeled crossline/inline sections may be used, resulting in continuous salt horizon surfaces, fitting for a ML model that is to be trained on samples along the depth direction of the survey.

However, as noted above, to incorporate continuous depth-sectional information, the user may extract depth slices from a pseudo-depth surface predicted from ML models built using crossline and inline training data. To that end, the second portion of the proposed workflow (in FIG. 6) may be formulated as a salt-body-based approach (e.g., salt is treated as one class, and the sediments are treated as another class) as opposed to the first portion (in FIG. 6) which is performed using boundary detection.

The depth-direction may provide encoded information that may not be evident from the crossline and inline directions, but may be noticeable from a different perspective. The amplitude distribution and characteristics of the crossline/inline seismic sections may be different from that of the slices obtained in the direction of the depth.

FIG. 8A illustrates an image 800 showing the amplitude distribution of a crossline slice (e.g., in the crossline direction), FIG. 8B illustrates an image 810 showing the amplitude distribution of an inline slice (e.g., in the inline direction), and FIG. 8C illustrates an image 820 showing the amplitude distribution of a depth slice (e.g., in the depth direction), according to an embodiment. As shown, the amplitude distribution of the crossline/inline slices is different from that of the depth slice.

Using measures such as maximum entropy (e.g., disorder in the encoded information), first, second, and third order moments of the amplitude values within the matrix, amplitude histograms, and joint histograms of features such as color, texture, and gradient magnitude, the user may observe the difference in the information provided by crossline/inline seismic sections and the depth slices.

Figure 9:
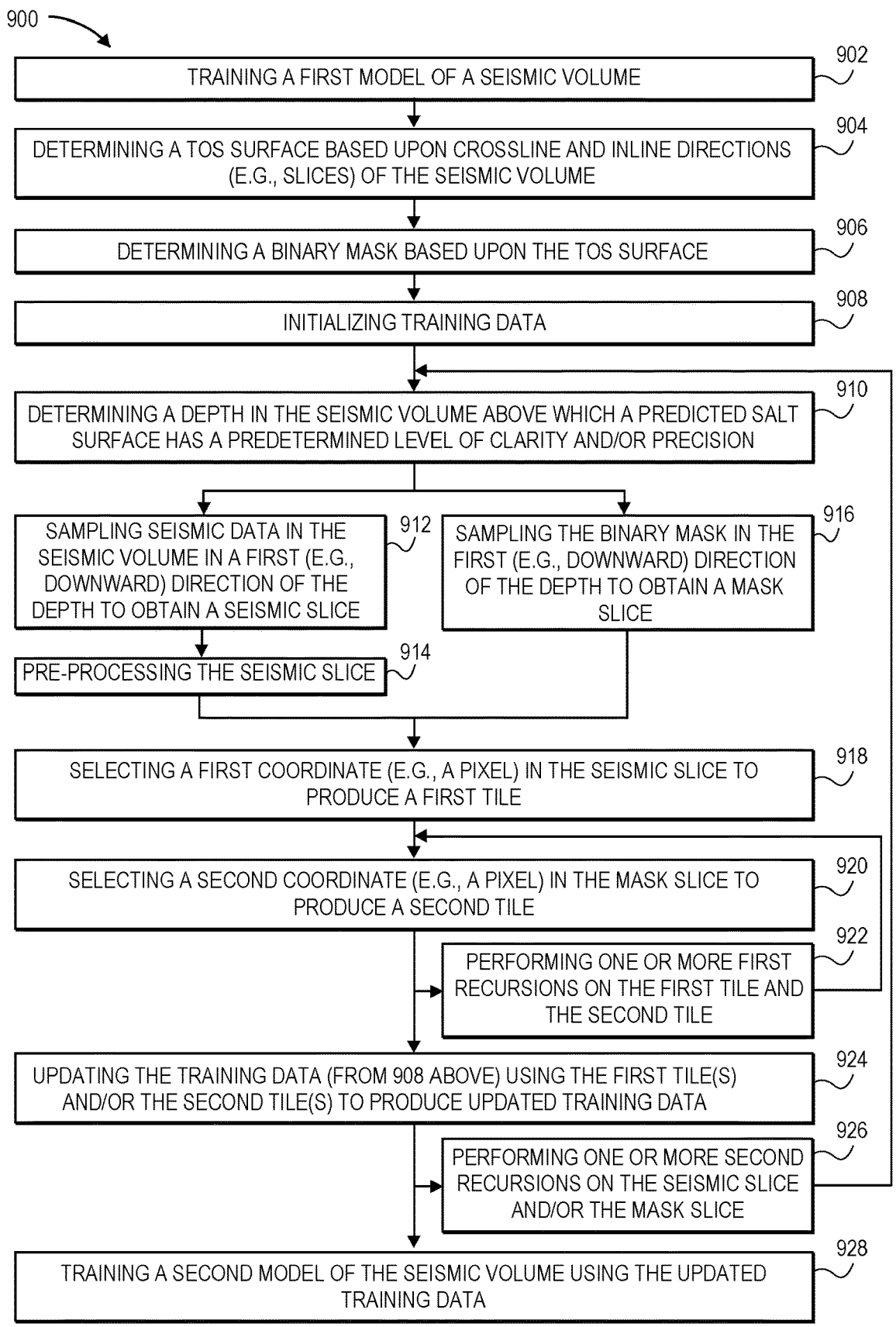
FIG. 9 illustrates a flowchart of a method for training a machine-learning (ML) model, according to an embodiment.

FIG. 9 illustrates a flowchart of a method 900 for training a ML model, according to an embodiment. The method 900 may include training a first model of a seismic volume, as at 902. The first model may be or include a supervised ML model of a TOS surface in the seismic volume. The first model may be trained using measured or received data from a crossline direction and/or an inline direction of the seismic volume. The data may be or include crossline slices and/or inline slices of the seismic volume. The seismic volume may be or include a cube (e.g., a seismic cube).

The method 900 may also include determining a TOS surface based on crossline and inline directions (e.g., slices) of the seismic volume, as at 904. The method 900 may also include determining a binary mask based at least partially upon the TOS surface, as at 906. The binary mask may refer to a two dimensional matrix of the same dimensions as that of a seismic depth slice of the seismic volume with values at each point in the matrix between 0 and 1, where a higher the value indicates a higher probability of salt. The method 900 may also include initializing training data (e.g., for the first model), as at 908. The training data may be or include a plurality of pairs. For each pair, one part is seismic, and the other part is the corresponding mask, as described in greater detail below.

The method 900 may also include determining a depth in the seismic volume above which a predicted salt surface has a predetermined level of clarity and/or precision, as at 910. As will be appreciated, the level of clarity and/or precision may be inversely proportional to the depth (i.e., clarity and/or precision decrease as depth increases).

The method 900 may also include sampling seismic data in the seismic volume in a first (e.g., downward) direction of the depth to obtain a training seismic slice, as at 912. The method 900 may also include pre-processing the training seismic slice, as at 914. Pre-processing the training seismic slice may include removing outliers from the training seismic slice, normalizing the training seismic slice, performing logarithmic normalization on the training seismic slice, or a combination thereof.

The method 900 may also include sampling the binary mask in the first (e.g., downward) direction of the depth to obtain a mask slice, as at 916. As used herein, a "mask slice" refers to a slice of the binary mask. The method 900 may also include selecting a first coordinate (e.g., a pixel) in the training seismic slice to produce a first tile, as at 918. The method 900 may also include selecting a second coordinate (e.g., a pixel) in the mask slice to produce a second tile, as at 920. The X and Y values of the first coordinate (from 918) and the second coordinate (from 920) may be the same. For example, if the first coordinate in the training seismic slice has an X value of 10 and a Y value of 20, then the second coordinate in the mask slice may have an X value of 10 and a Y value of 20. The first and second coordinates may define/yield a pair (e.g., similar to the pairs in the training data at 908 above).

The method 900 may also include performing one or more first recursions on the first tile and the second tile, as at 922. For example, the first recursion(s) may be from an X value of 1 to an X value of 300, and from a Y value of 1 to a Y value of 300. This may yield a plurality of pairs of coordinates.

The method 900 may also include updating the training data (from 908 above) using the first tile(s) and/or the second tile(s) to produce updated training data, as at 924. The method 900 may also include performing one or more second recursions on the training seismic slice and/or the mask slice, as at 926. The second recursion(s) may be from a depth value of, for example, 1 to D, where D represents the depth at which the predicted salt surface has the predetermined level of clarity and/or precision (from 910 above). The method 900 may also include training a second model of the seismic volume using the updated training data, as at 928. The second model may be or include a supervised ML model of the TOS surface of the seismic volume. In at least one embodiment, the second model may be an updated version of the first model.

In the method 900, to train the second model, seismic data (e.g., depth slices) may not be sampled from the top to the bottom of the seismic volume (e.g., the seismic cube). Instead, the workflow may be trained on predicted labels for well-imaged parts of the seismic cube, above the depth determined at 910 (e.g., in the upper half of the seismic volume). This is done because, in seismic data acquired by shooting acoustic signals into the earth, the signal-to-noise ratio depreciates as depth increases. A substantial amount of training data for the areas that are not salt below the depth determined at 910 (e.g., the parts in the lower half of the seismic volume that consist mainly of the sea bottom) may also be used to regularize the second model. The second model may predict a salt body even in the most ambiguous parts of the seismic volume, where sediment is sufficiently mixed with the halite salt, in turn predicting the salt body instead of merely a surface. This workflow assumes that the surface generated from training along crosslines and inlines may be improved upon.

Figure 10:
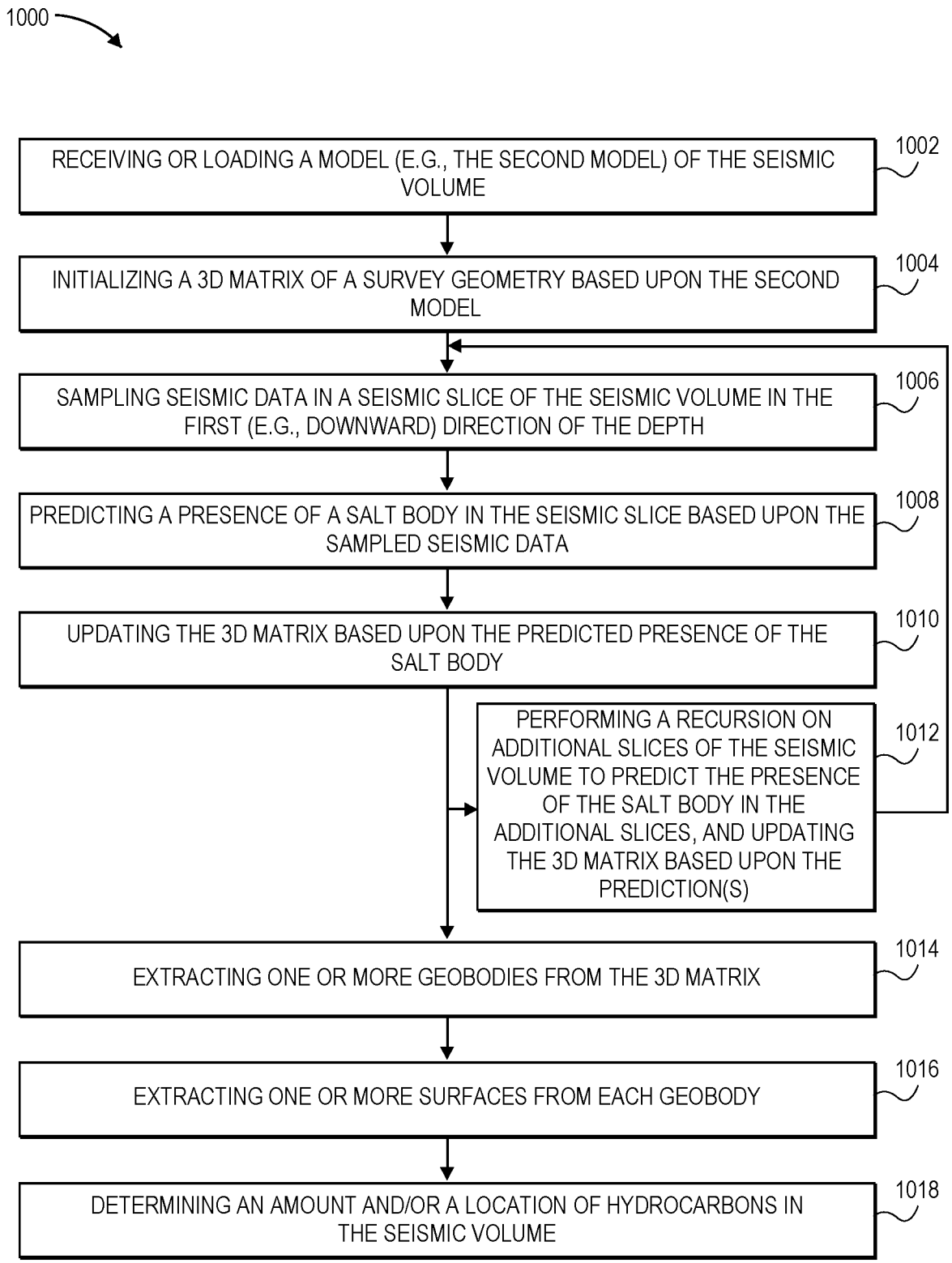
FIG. 10 illustrates a flowchart of a method for locating hydrocarbons in a seismic volume (e.g., using the trained ML model from FIG. 9), according to an embodiment.

FIG. 10 illustrates a flowchart of a method 1000 for locating hydrocarbons in the seismic volume, according to an embodiment. The method 1000 may build upon the method 900. The method 1000 may include receiving or loading the second model of the seismic volume (from 928 above), as at 1002.

The method 1000 may also include initializing a 3D matrix of a survey geometry based at least partially upon the second model, as at 1004. This may include generating an empty 3D matrix that corresponds to the second model and/or the seismic volume. For example, the 3D matrix may have the same geometry (e.g., size and/or shape) as the second model and/or the seismic volume. Thus, the 3D matrix may have a crossline dimension, an inline dimension, and a depth dimension.

The method 1000 may also include sampling seismic data in an evaluation seismic slice of the seismic volume (or the second model) in the first (e.g., downward) direction of the depth, as at 1006. While the depth may be sampled in the first (e.g., downward) direction from the top of the seismic volume to the determined depth in 912 above, here, the depth may be sampled even deeper. For example, the depth here may be sampled from the top of the seismic volume to the bottom of the seismic volume, where the determined depth is between the top and the bottom.

The method 1000 may also include predicting a presence of a salt body in the evaluation seismic slice based upon the sampled seismic data, as at 1008. The method 1000 may also include updating the 3D matrix based upon the predicted presence of the salt body, as at 1010.

The method 1000 may also include performing a recursion on additional evaluation seismic slices of the seismic volume to predict the presence of the salt body in the additional evaluation seismic slices, and updating the 3D matrix of survey geometry based upon the prediction(s), as at 1012. In other words, 1006, 1008, and 1010 may be repeated (e.g., iteratively) on additional evaluation seismic slices of the seismic volume until the seismic volume has been completed.

The method 1000 may also include identifying or extracting one or more geobodies from the 3D matrix, as at 1014. As used herein, a "geobody" refers to geological elements in the seismic volume, such as salt (e.g., halite bodies), seismic facies, etc. The method 1000 may also include identifying or extracting one or more surfaces from each geobody, as at 1016.

The method 1000 may also include determining an amount and/or a location of hydrocarbons in the seismic volume, as at 1018. The amount and/or location may be determined based upon the 3D matrix, the one or more geobodies, and/or the surfaces of the geobodies.

Thus, the model may make a prediction on each slice along the depth of the seismic volume (e.g., seismic cube), which is then stacked on top of the other slices to form a binary cube (e.g., 1=salt; 0=no salt). The geobody extracted from the binary cube may be used by seismic interpreters to understand the general distribution of salt in the survey area and can be consumed by any seismic interpretation tool and be post-processed to extract any surface, top or base of salt from the geobody.

Figure 11A:
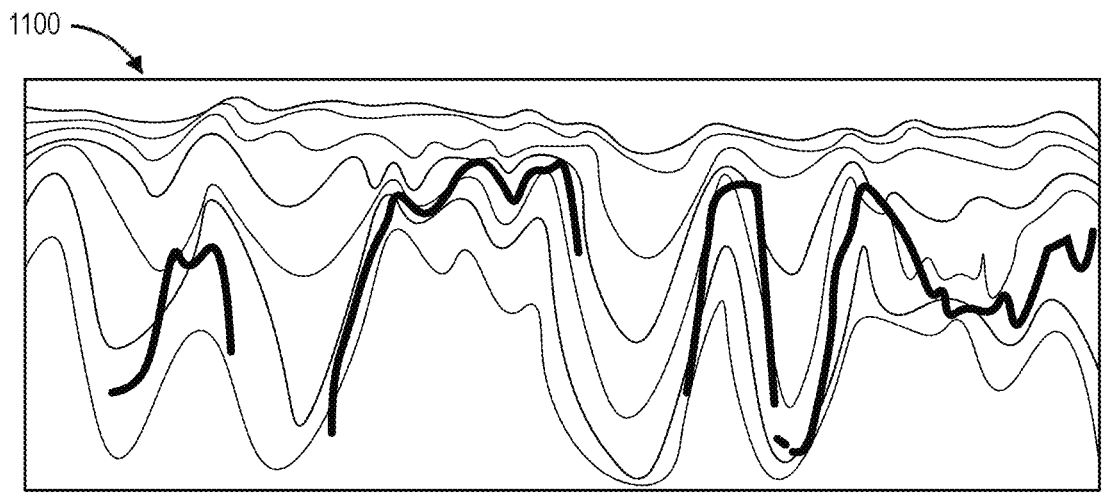
FIG. 11A illustrates an image of a top of salt selected by an interpreter, according to an embodiment.
Figure 11B:
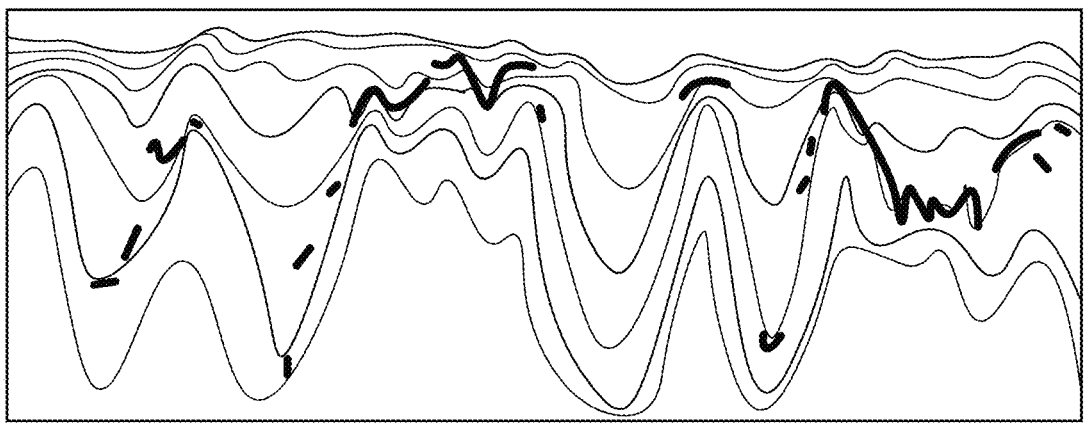
FIG. 11B illustrates the image of FIG. 11A with the top of salt selected using a machine-learning algorithm that considers information from the crossline and inline directions, according to an embodiment.
Figure 11C:
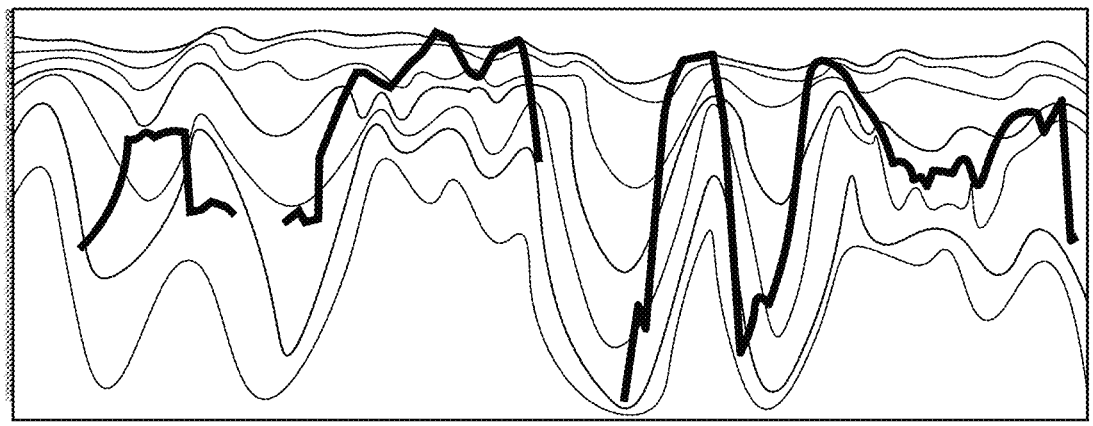
FIG. 11C illustrates the image of FIG. 11A with the top of salt selected based upon the orthogonal directions of the seismic data, according to an embodiment.

FIGS. 11A, 11B, and 11C illustrate images of the same portion of a subterranean formation. FIGS. 11A-11C may be used to illustrate the methods 900, 1000 above for the case of TOS interpretation. In the image 1100 in FIG. 11A, a top of salt is manually selected by an interpreter. In the image 1110 in FIG. 11B, the top of salt is predicted using a ML algorithm that considers information from the crossline and inline directions (e.g., not the depth direction). In the image 1120 in FIG. 11C, the top of salt is predicted based at least partially upon the orthogonal directions of the seismic data (e.g., crossline, inline, and depth directions). The top of salt identified in FIG. 11C provides more information than can be derived from just crosslines and inline directions.

Figure 12:
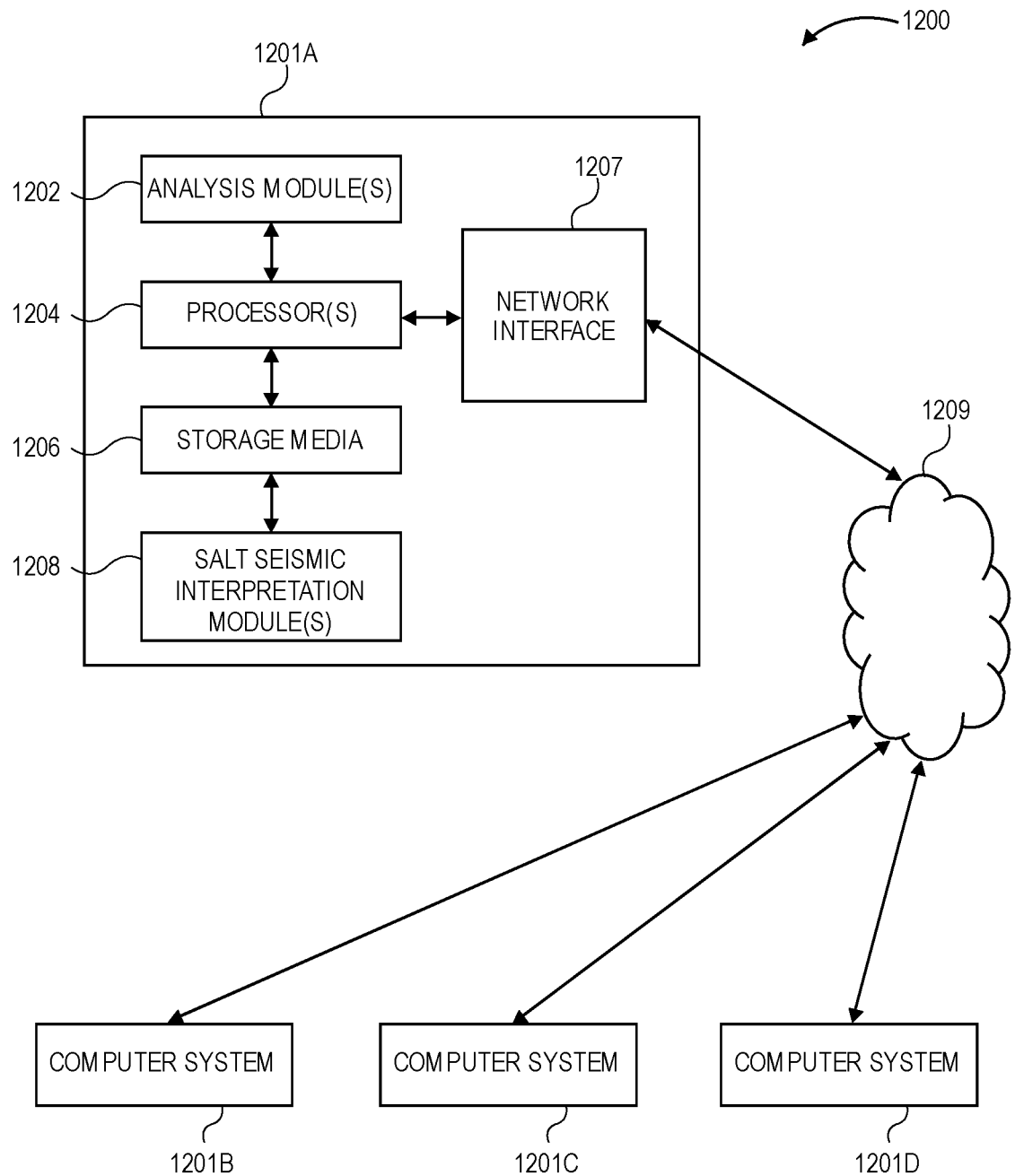
FIG. 12 illustrates a schematic view of a computing system for performing one or more of the methods disclosed herein, according to an embodiment.

In some embodiments, any of the methods of the present disclosure may be executed by a computing system. FIG. 12 illustrates an example of such a computing system 1200, in accordance with some embodiments. The computing system 1200 may include a computer or computer system 1201A, which may be an individual computer system 1201A or an arrangement of distributed computer systems. The computer system 1201A includes one or more analysis module(s) 1202 configured to perform various tasks according to some embodiments, such as one or more methods disclosed herein. To perform these various tasks, the analysis module 1202 executes independently, or in coordination with, one or more processors 1204, which is (or are) connected to one or more storage media 1206. The processor(s) 1204 is (or are) also connected to a network interface 1209 to allow the computer system 1201A to communicate over a data network 1209 with one or more additional computer systems and/or computing systems, such as 1201B, 1201C, and/or 1201D (note that computer systems 1201B, 1201C and/or 1201D may or may not share the same architecture as computer system 1201A, and may be located in different physical locations, e.g., computer systems 1201A and 1201B may be located in a processing facility, while in communication with one or more computer systems such as 1201C and/or 1201D that are located in one or more data centers, and/or located in varying countries on different continents).

A processor can include a microprocessor, microcontroller, processor module or subsystem, programmable integrated circuit, programmable gate array, or another control or computing device.

The storage media 1206 can be implemented as one or more computer-readable or machine-readable storage media. Note that while in the example embodiment of FIG. 12 storage media 1206 is depicted as within computer system 1201A, in some embodiments, storage media 1206 may be distributed within and/or across multiple internal and/or external enclosures of computing system 1201A and/or additional computing systems. Storage media 1206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1200 contains one or more salt seismic interpretation module(s) 1208. In the example of computing system 1200, computer system 1201A includes the salt seismic interpretation module 1208. In some embodiments, a single salt seismic interpretation module may be used to perform some or all aspects of one or more embodiments of the methods. In alternate embodiments, a plurality of salt seismic interpretation modules may be used to perform some or all aspects of methods.

It should be appreciated that computing system 1200 is only one example of a computing system, and that computing system 1200 may have more or fewer components than shown, may combine additional components not depicted in the example embodiment of FIG. 12, and/or computing system 1200 may have a different configuration or arrangement of the components depicted in FIG. 12. The various components shown in FIG. 12 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1200, FIG. 12), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method, comprising:
training a first machine learning model using data from a crossline direction and an inline direction of a seismic volume;
determining, using the first machine learning model, a top of salt (TOS) surface in the seismic volume based on crossline direction slices of the seismic volume and inline direction slices of the seismic volume;
determining a binary mask based upon the determined TOS surface;
initializing training data of the seismic volume based on output from the trained first machine learning model;
determining a depth in the seismic volume above which a predicted salt surface has a predetermined level of clarity;
sampling seismic data in the seismic volume in a depth direction to obtain a training seismic slice, wherein the training seismic slice includes information from the crossline direction, the inline direction, and the depth direction;
sampling the binary mask in the depth direction to obtain a mask slice;
selecting a first coordinate in the training seismic slice to produce a first tile;
selecting a second coordinate in the mask slice to produce a second tile;
updating the training data of the seismic volume based upon the first tile and the second tile;
training a second machine learning model using the updated training data;
determining, using the second machine learning model, a presence of a salt body in an evaluation seismic slice;
generating, by the second machine learning model, a three-dimensional (3D) model of a subterranean formation with the salt body delineated in the seismic volume;
displaying the 3D model of the subterranean formation with the salt body in the seismic volume;
determining, based on the 3D model of the subterranean formation, fluid flow characteristics of a reservoir in a field of the subterranean formation; and
controlling, based on the 3D model of the subterranean formation, drilling in the reservoir.

2. The method of claim 1, wherein the seismic data is sampled in from a top of the seismic volume to the depth to obtain the training seismic slice.

3. The method of claim 2, further comprising sampling the seismic data in the seismic volume to obtain the evaluation seismic slice, wherein the seismic data is sampled from the top of the seismic volume to a bottom of the seismic volume to obtain the evaluation seismic slice, and wherein the depth is between the top and the bottom.

4. The method of claim 1, further comprising generating, by the second machine learning model, a three-dimensional (3D) matrix based upon the evaluation seismic slice, wherein the 3D matrix indicates the presence of the salt body.

5. The method of claim 4, further comprising:
extracting, by the second machine learning model, a geobody from the 3D matrix; and
extracting, by the second machine learning model, a surface from the geobody.

6. The method of claim 5, further comprising determining, by the second machine learning model, a presence of hydrocarbons in the seismic volume based upon the 3D matrix, the geobody, the surface, or a combination thereof.

7. The method of claim 1, further comprising:
sending, using an acoustic energy source, sound vibrations into a subsurface in the field; and
receiving, in response to sending the sound vibrations, a seismic survey of the seismic volume with electric signals embedded with information of the subsurface captured and recorded from seismic wave reflections off the subsurface.

8. A method, comprising:
training a first machine learning model using data from a crossline direction and an inline direction of a seismic volume;
determining, using the first machine learning model, a top of salt (TOS) surface in the seismic volume based on crossline direction slices of the seismic volume and inline direction slices of the seismic volume;
determining a binary mask based upon the determined TOS surface;
initializing training data of the seismic volume based on output from the trained first machine learning model;
determining a depth in the seismic volume above which a predicted salt surface has a predetermined level of clarity;
sampling seismic data in the seismic volume in a depth direction to obtain a training seismic slice, wherein the training seismic slice includes information from the crossline direction, the inline direction, and the depth direction;
sampling the binary mask in the depth direction to obtain a mask slice;
selecting a first coordinate in the training seismic slice to produce a first tile;
selecting a second coordinate in the mask slice to produce a second tile;
updating the training data of the seismic volume based upon the first tile and the second tile
training a second machine learning model using the updated training data;
sampling, by the second machine learning model, the seismic data in the seismic volume to obtain an evaluation seismic slice;
determining, by the second machine learning model, a presence of a salt body in the evaluation seismic slice based upon the seismic data in the evaluation seismic slice;
generating, by the second machine learning model, a three-dimensional (3D) matrix based upon the evaluation seismic slice, wherein the 3D matrix indicates the presence of the salt body;
generating, by the second machine learning model, a 3D model of a subterranean formation with the salt body delineated in the seismic volume;
displaying the 3D model of the subterranean formation with the salt body identified in the evaluation seismic slice;
determining, based on the 3D model of the subterranean formation, fluid flow reservoir characteristics of a reservoir in a field of the subterranean formation; and
controlling, based on the 3D model of the subterranean formation, drilling in the reservoir.

9. The method of claim 8, wherein the binary mask comprises a binary two-dimensional (2D) matrix.

10. The method of claim 8, wherein the seismic data is sampled in a downward direction from a top of the seismic volume to the depth to obtain the training seismic slice, and wherein the seismic data is sampled in the downward direction from the top of the seismic volume to a bottom of the seismic volume to obtain the evaluation seismic slice, wherein the depth is between the top and the bottom.

11. The method of claim 8, wherein the first coordinate and the second coordinate have a common X value and a common Y value.

12. The method of claim 11, further comprising performing a plurality of recursions on the first tile and the second tile for a plurality of X values and a plurality of Y values.

13. The method of claim 8, further comprising performing a plurality of recursions on the training seismic slice and the mask slice.

14. The method of claim 8, wherein the 3D matrix has a same size and shape as the seismic volume.

15. The method of claim 8, further comprising performing a plurality of recursions on the evaluation seismic slice.

16. The method of claim 8, further comprising extracting, by the second machine learning model, a geobody from the 3D matrix.

17. The method of claim 16, further comprising extracting, by the second machine learning model, a surface from the geobody.

18. The method of claim 17, further comprising determining, by the second machine learning model, a presence of hydrocarbons in the seismic volume based upon the 3D matrix, the geobody, the surface, or a combination thereof.

19. A computing system comprising:
one or more processors; and
a memory system comprising one or more non-transitory computer-readable media storing instructions that, when executed by at least one of the one or more processors, cause the computing system to perform operations, the operations comprising:
training a first machine learning model using data from a crossline direction and an inline direction of a seismic volume;
determining, using the first machine learning model, a top of salt (TOS) surface in the seismic volume based upon crossline direction slices of the seismic volume and inline direction slices of the seismic volume;

determining a binary mask based upon the determined TOS surface, wherein the binary mask comprises a binary two-dimensional (2D) matrix;

initializing training data of the seismic volume based on output of the trained first machine learning model;

sampling seismic data in the seismic volume to a first depth in the seismic volume above which a predicted salt surface has a predetermined level of clarity to obtain a training seismic slice, wherein the training seismic slice includes information from the crossline direction, the inline direction, and a depth direction;

sampling the binary mask to obtain a mask slice;

selecting a first coordinate in the training seismic slice to produce a first tile;

selecting a second coordinate in the mask slice to produce a second tile;

updating the training data of the seismic volume based upon the first tile and the second tile;

training a second machine learning model using the updated training data;

sampling, by the second machine learning model, the seismic data in the seismic volume to a second depth to obtain an evaluation seismic slice, wherein the second depth is greater than the first depth;

determining, by the second machine learning model, a presence of a salt body in the evaluation seismic slice based upon the seismic data in the evaluation seismic slice;

generating, by the second machine learning model, a three-dimensional (3D) matrix based upon the evaluation seismic slice, wherein the 3D matrix indicates the presence of the salt body;

extracting, by the second machine learning model, a geobody from the 3D matrix;

extracting, by the second machine learning model, a surface from the geobody;

determining, by the second machine learning model, a presence of hydrocarbons in the seismic volume based upon the 3D matrix, the geobody, the surface, or a combination thereof;

generating, by the second machine learning model, a three-dimensional (3D) model of a subterranean formation with the hydrocarbons in the seismic volume;

displaying the 3D model of the subterranean formation with the hydrocarbons;

determining, based on the 3D model of the subterranean formation, fluid flow characteristics of a reservoir in a field of the subterranean formation; and controlling, based on the 3D model of the subterranean formation, drilling in the reservoir.

20. The computing system of claim 19, wherein the operations comprise:

sending, using an acoustic energy source, sound vibrations into a subsurface in the field; and receiving, in response to sending the sound vibrations, a seismic survey of the seismic volume with electric signals embedded with information of the subsurface captured and recorded from seismic wave reflections off the subsurface.

* * * * *